United States Patent
Shutic et al.

(10) Patent No.: US 9,339,835 B2
(45) Date of Patent: May 17, 2016

(54) OVERSPRAY COLLECTION APPARATUS FOR A POWDER SPRAY BOOTH

(71) Applicant: Nordson Corporation, Westlake, OH (US)

(72) Inventors: Jeffrey R. Shutic, Wakeman, OH (US); Robert D. Schneider, Vermilion, OH (US); Jeffery Edward Dailidas, Barrington, IL (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/373,710

(22) PCT Filed: Feb. 4, 2013

(86) PCT No.: PCT/US2013/024572
§ 371 (c)(1),
(2) Date: Jul. 22, 2014

(87) PCT Pub. No.: WO2013/119487
PCT Pub. Date: Aug. 15, 2013

(65) Prior Publication Data
US 2015/0027365 A1  Jan. 29, 2015

Related U.S. Application Data

(60) Provisional application No. 61/595,297, filed on Feb. 6, 2012.

(51) Int. Cl.
*B05C 19/00* (2006.01)
*B05B 1/28* (2006.01)
*B05B 15/12* (2006.01)

(52) U.S. Cl.
CPC ......... *B05B 15/1259* (2013.01); *B05B 15/1203* (2013.01); *B05B 15/1214* (2013.01); *Y02P 70/36* (2015.11)

(58) Field of Classification Search
CPC ............ B05B 15/1203; B05B 15/1214; B05B 15/1259
USPC .............. 118/326, 308, 309, 634, 50, DIG. 5, 118/602; 454/50, 53; 55/DIG. 46; 427/180
See application file for complete search history.

(56) References Cited

U.S. PATENT DOCUMENTS 6,471,737 B2 * 10/2002 Cole .................... B01D 50/002
   118/326
6,589,345 B2 *  7/2003 Gelain ................ B05B 15/1211
   118/308

(Continued)

FOREIGN PATENT DOCUMENTS

CN   201227621 Y   4/2009
CN   201446047 U   5/2010

(Continued)

OTHER PUBLICATIONS

International Search Report dated May 10, 2013, for International Application No. PCT/US2013/024572.

(Continued)

*Primary Examiner* — Yewebdar Tadesse
(74) *Attorney, Agent, or Firm* — Baker & Hostetler LLP

(57) ABSTRACT

Overspray collection apparatus comprises an extraction duct (54) between two sloped floors (50, 52) with unobstructed inlet slots (88, 90) on either side thereof. The extraction duct (54) comprises two moveable panels (56, 58) pivotally mounted to the sloped floors (50, 52). Each moveable panel (56, 58) pivots about an axis that is offset from a lower portion of the moveable panel and a lower portion of the sloped floor. In another embodiment, the pivotal mount comprises an offset hinge. The overspray extraction duct (54) comprises a duct floor (60) and an air diffuser assembly (100) that extends at least partially across the duct floor. The air diffuser assembly (100) receives pressurized air and directs pressurized air into the extraction duct (54), whereby the pressurized air may be pulsed. The overspray extraction duct (54) comprises a suction hood (62) that includes moveable panels (56, 58). Optional actuators may apply a force impulse to one or more of the moveable panels (56, 58), and/or to open and close the suction hood (62) automatically.

21 Claims, 11 Drawing Sheets

(56) References Cited

U.S. PATENT DOCUMENTS

Figure 1:
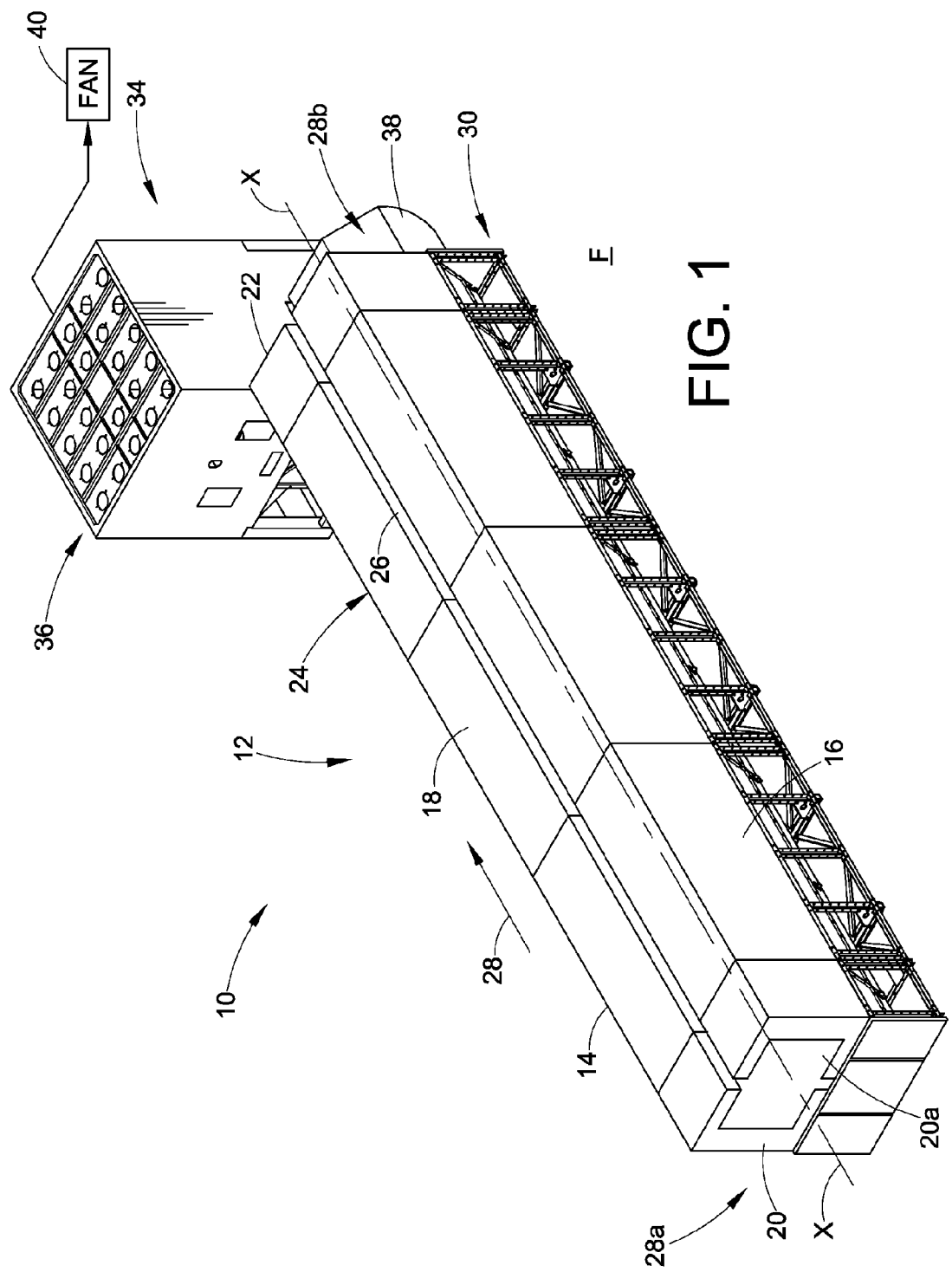

| | | | | |
|---|---|---|---|---|
| 2002/0046701 | A1* | 4/2002 | Browning | B05B 15/1218 118/326 |
| 2004/0035359 | A1* | 2/2004 | Kannan | C23C 16/34 118/715 |

FOREIGN PATENT DOCUMENTS

| | | |
|---|---|---|
| DE | 4446089 | 6/1996 |
| EP | 1162002 | 12/2001 |
| FR | 2920323 | 3/2009 |
| WO | 02/074442 | 9/2002 |

OTHER PUBLICATIONS

Written Opinion dated May 10, 2013, for International Application No. PCT/US2013/024572.

International Preliminary Report on Patentability dated Aug. 12, 2014, for International Application No. PCT/US2013/024572.

Chinese Application No. 201380008200: First Office Action dated Dec. 4, 2015, 7 pages.

* cited by examiner

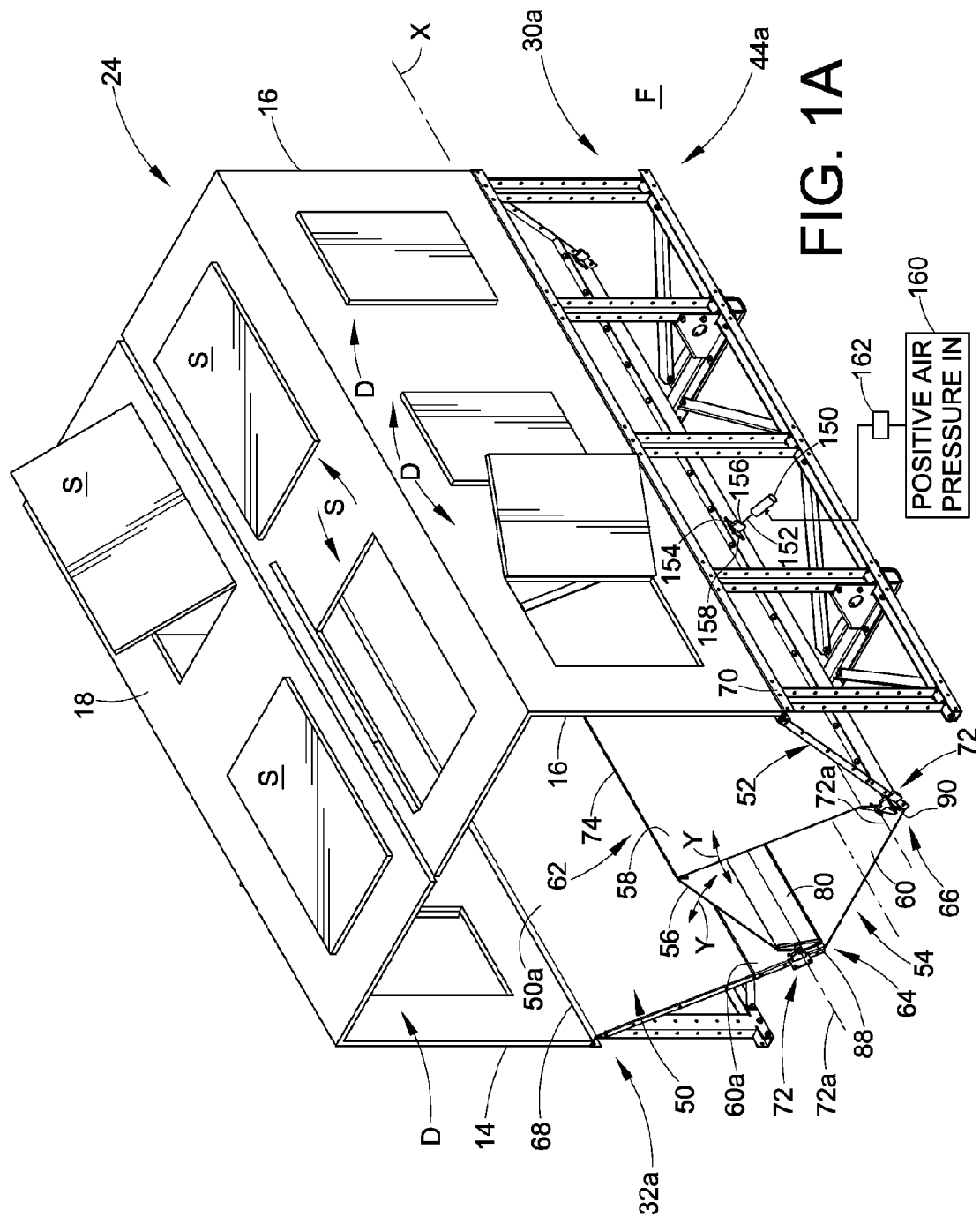

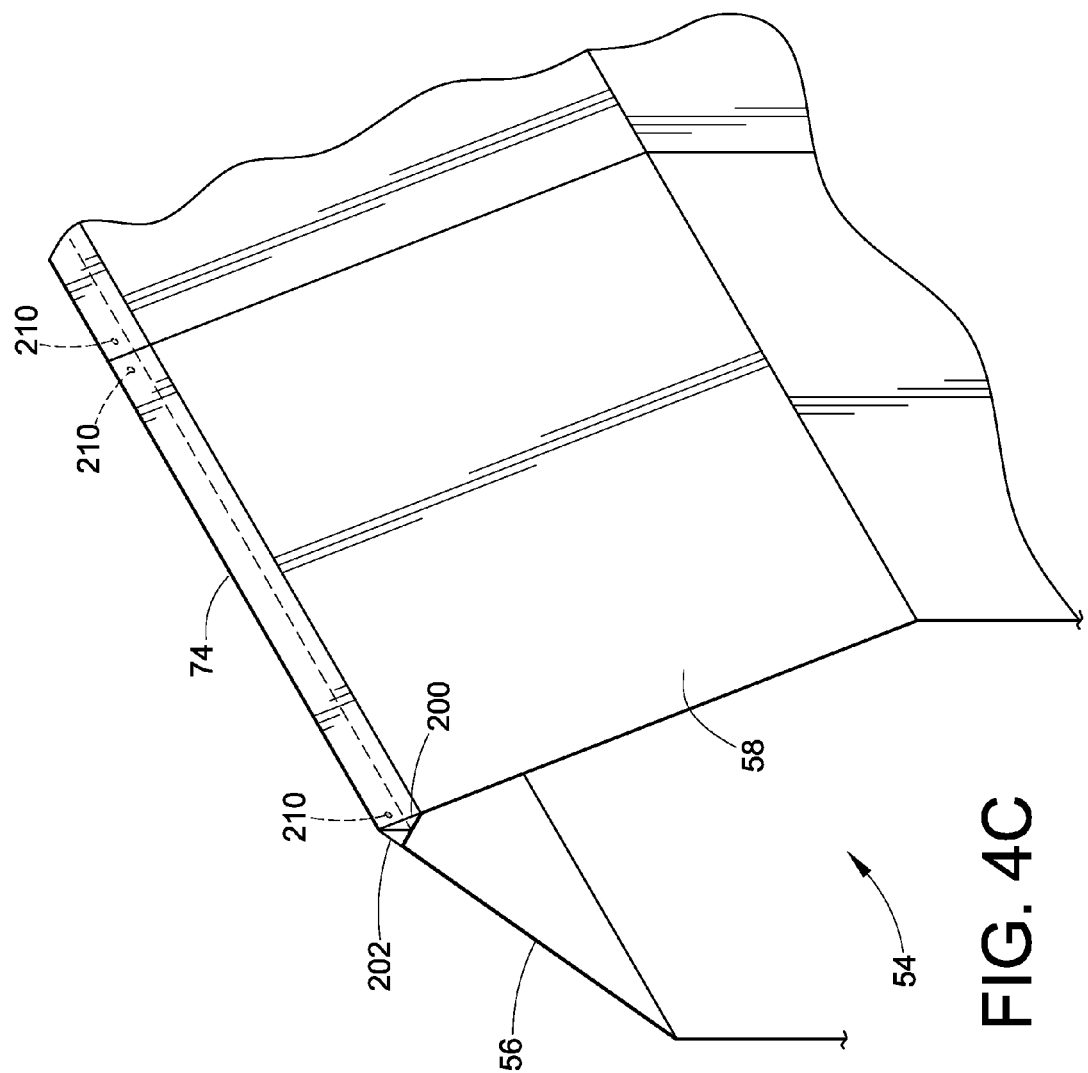

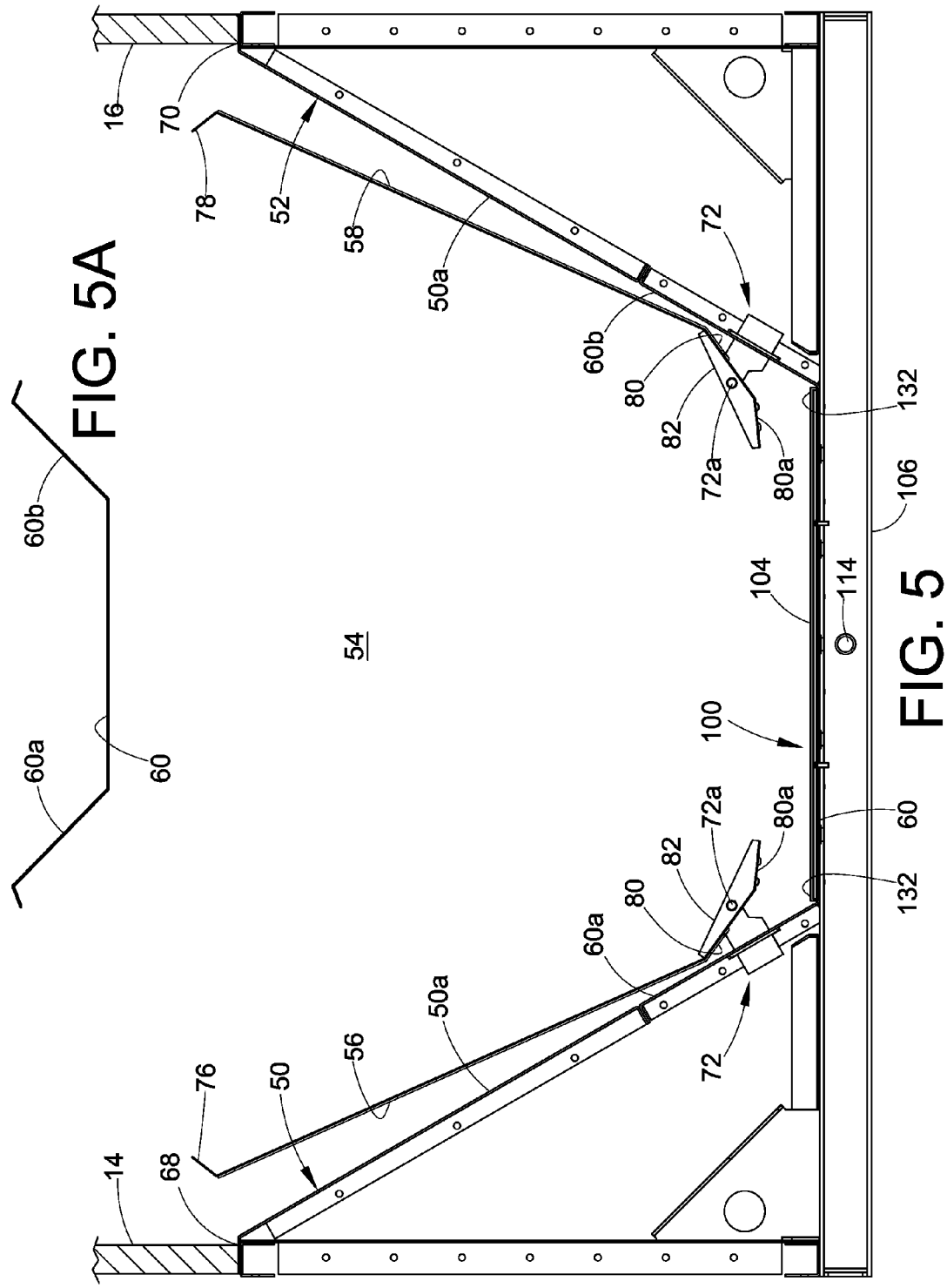

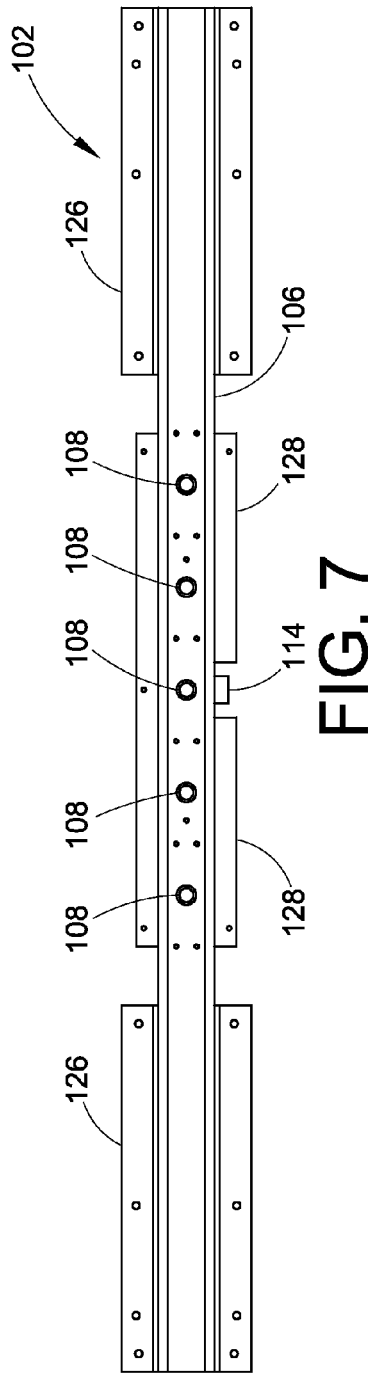
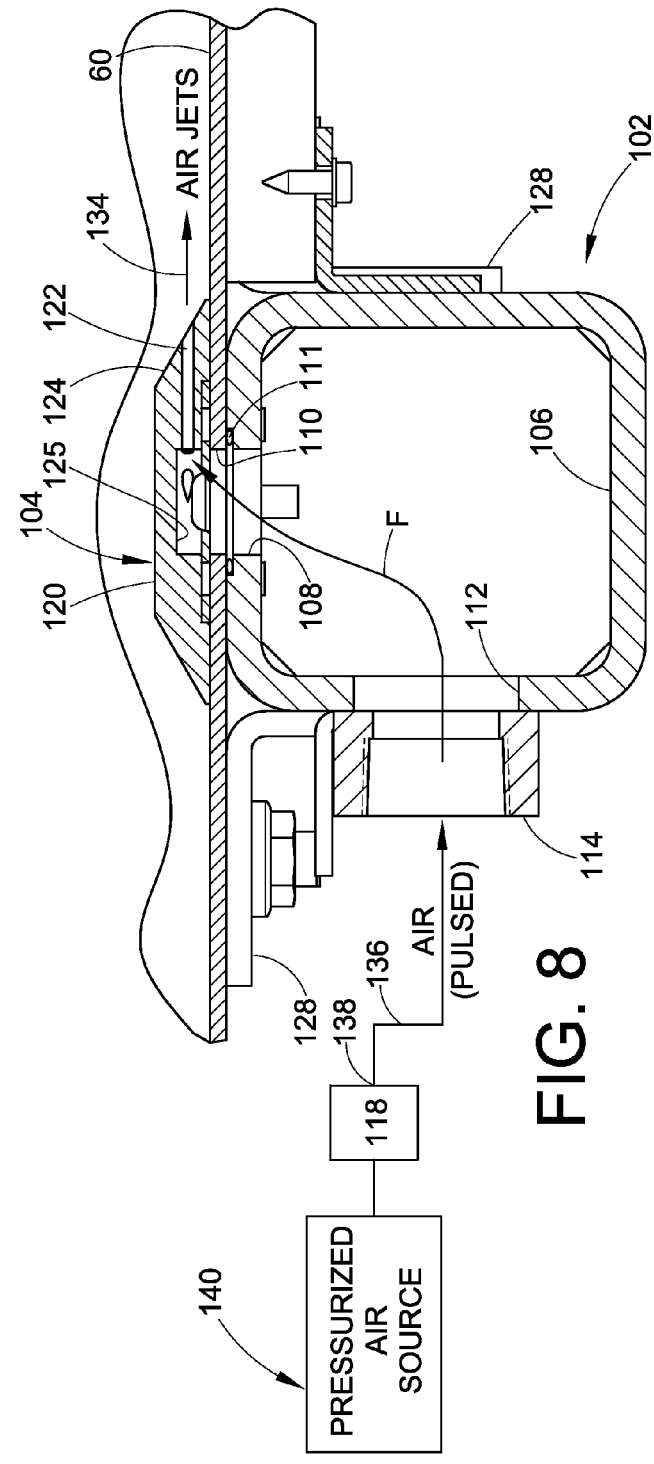
FIG. 7
FIG. 8

OVERSPRAY COLLECTION APPARATUS FOR A POWDER SPRAY BOOTH

CROSS REFERENCE TO RELATED APPLICATIONS

The present application is a national phase entry under 35 U.S.C. §371 of, and claims priority to, International Application No. PCT/US2013/024572 filed on Feb. 4, 2013, for OVERSPRAY COLLECTION APPARATUS FOR A POWDER SPRAY BOOTH, which claims priority to U.S. Provisional Patent Application Ser. No. 61/595,297 filed on Feb. 6, 2012, the entire disclosures of which are fully incorporated herein by reference.

TECHNICAL FIELD OF THE DISCLOSURE

The inventions relate generally to material application apparatus such as may be used, for example, to spray heavy coating material like glass. More particularly, the inventions relate to an overspray collection apparatus for removing overspray coating material from a spray containment booth.

BACKGROUND OF THE DISCLOSURE

A material application apparatus is regularly used for applying coating material to an object, part or other work piece or surface. A material application apparatus often includes a material application device, also referred to as a spray gun. Material application apparatus are often used to apply powder coating material and liquid coating material. It is also known to apply porcelain enamel coatings to work pieces. Porcelain enamel coating material is a fine glass powder-like material, but is unlike lower melting temperature organic powder coating material that is lighter, commonly exhibits impact fusion and has a fairly high transfer ratio or efficiency (transfer ratio or efficiency refers to the percentage of powder coating material that adheres to the work piece during a coating or spraying operation). Porcelain enamel coating materials are difficult to electrostatically charge, heavier than organic powder coating materials, highly abrasive and exhibit low transfer efficiencies along the order of about twenty percent. The low transfer efficiencies are due in part to the difficulty in charging the coating material.

SUMMARY OF THE DISCLOSURE

An embodiment of an overspray collection apparatus for a spray booth comprises an extraction duct that is disposed between two sloped floors. The extraction duct comprises a bottom panel or duct floor and may include two moveable panels each of which is pivotally mounted to a respective one of the sloped floors. Each moveable panel may pivot about an axis that is offset from a lower portion of the moveable panel and a lower portion of the associated sloped floor. This offset pivot axis provides an inlet slot to the extraction duct on each side of the extraction duct. Alternatively, the offset pivot axis may provide a standoff or gap between the moveable panel and the sloped floor to provide an inlet slot to the extraction duct. In another embodiment, the pivotal mount comprises an offset hinge. In another embodiment, the extraction duct may be modular in construction, with two or more extraction duct sections aligned end to end along a longitudinal axis of the spray booth.

In an embodiment of a spray booth, an overspray extraction channel may be connectable in fluid communication with a source of suction at a suction end of the extraction channel, the extraction duct comprising a channel floor and at least one air diffuser assembly that is disposed across the channel floor, wherein the air diffuser assembly receives pressurized air and directs the pressurized air into the extraction channel. In another embodiment, the air diffuser assembly directs pressurized air in a direction towards the suction end of the extraction channel. In another embodiment, the air diffuser assembly may be periodically pulsed or actuated, and different air diffuser assemblies may be pulsed at different frequencies.

In an embodiment of a spray booth, an overspray extraction duct comprises a suction hood that includes moveable panels that can be moved between open and closed positions. In the open position, an operator can access the interior surfaces of the extraction duct for cleaning One or more actuators optionally may be provided to move the moveable panels between the open position and the closed position. In another embodiment, an actuator may be used to apply a force impulse to one or more of the moveable panels.

These and other aspects and advantages of the present inventions will be appreciated and understood by those skilled in the art from the following detailed description of the exemplary embodiments in view of the accompanying drawings.

BRIEF DESCRIPTION OF THE DRAWINGS

FIG. 1 illustrates in isometric view an exemplary spray booth and overspray recovery system as may be used with the present inventions;

FIG. 2 is the arrangement of FIG. 1 with the spray booth illustrated canopy being in phantom to show an overspray collection apparatus in accordance with the present disclosure;

FIG. 1A is an enlarged isometric view of a modular section of the overspray collection apparatus of FIG. 2 with an extraction duct in a closed position;

FIG. 3 is an isometric view of the modular section of FIG. 1A with the canopy omitted and with the extraction duct in an open position;

FIG. 4 is an end view in lateral cross-section through one of the air diffuser assemblies taken along the line 4-4 in FIG. 3 and with the extraction duct in a closed position;

FIGS. 4A-4C illustrate an optional ridge cap for the extraction duct embodiment of FIGS. 3 and 4;

FIG. 5 is the end view of FIG. 4 with the extraction duct in an open position, shown in lateral cross section through one of the air diffuser assemblies (line 4-4 in FIG. 3);

FIG. 5A illustrates an embodiment of an extraction duct floor including tapered side portions, in end elevation;

FIG. 6 is the view of FIG. 3 but showing an air diffuser assembly in exploded perspective;

FIG. 6A illustrates the overspray collection apparatus of FIG. 3 in plan view with the extraction duct open;

FIG. 7 illustrates an air manifold in plan view;

FIG. 8 illustrates a cross-section of an air diffuser assembly in lateral cross-section along the line 8-8 in FIG. 6A.

DETAILED DESCRIPTION OF EXEMPLARY EMBODIMENTS

While the exemplary embodiments are presented in the context of a porcelain enamel or other glass type powder application system, the embodiments and the inventions are not limited necessarily to that exemplary material. The inventions may be used in other particulate coating material application apparatus including those that apply non-glass powder coating materials. The exemplary embodiments also illustrate use of the inventions with an exemplary spray booth configuration and an exemplary extraction suction arrangement, however, the inventions may be used with many different spray booth designs and configurations as well as many different extraction suction arrangements.

While various aspects and features of the inventions are described and illustrated herein as embodied in combination and sub-combinations in the exemplary embodiments, these various aspects may be realized in many alternative embodiments, either individually or in various alternative combinations and sub-combinations thereof. Unless expressly excluded herein all such combinations and sub-combinations are intended to be within the scope of the present invention. Still further, while various alternative embodiments as to the various aspects and features of the inventions, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the inventions into additional embodiments within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions, however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments described herein.

By way of introduction of the inventions presented in this disclosure, porcelain enamel may be applied to objects using a fine glass powder or frit like material. Such enamels may be used, for example, on household appliances, food contact surfaces and other surfaces that are desired to be easy to clean and corrosion resistant. Unlike polymeric low melting temperature organic powders, however, porcelain enamel powder tends to be heavy and exhibits a low transfer ratio because it is difficult to electrostatically charge the material. The low transfer ratio means that a significantly lower percentage of the material adheres to the workpiece being coated, for example, on the order of about twenty percent. This produces a large amount of overspray which must be collected and removed from the spray booth. The high overspray characteristic, along with the weight of the glass material, makes collection and removal from the spray booth a challenge and in some respects we find that spray coating with porcelain enamel powder is a material handling challenge more than it is material application.

Rather than exhibiting impact fusion which is a common problem for organic powder coating material, a porcelain enamel material tends to accumulate together in narrow openings, and also is highly abrasive. This accumulation not only results in the enamel material remaining in the spray booth, but also can reduce the air flow into and through the spray booth. Moreover, because porcelain enamel powder is heavy, it is difficult to maintain the powder entrained in the air flow within an exhaust duct. The powder tends to fall out of the exhaust air stream and begin to collect on the exhaust duct floor, especially in areas of lower air flow or eddies. The more material that remains in the exhaust duct can increase the time it takes an operator to clean the exhaust duct, which can add significant time to an overall process for color change or other material change. The cleaning time is particularly increased for an operator having to blow off material or clear material from narrow spaces where the material has accumulated.

The present inventions are directed to several concepts and techniques, including method and apparatus embodiments thereof, for improving overspray collection. Some of the inventions may utilize all the concepts presented herein together in different embodiments, while other embodiments may utilize the concepts individually or in various combinations.

A first concept described in this disclosure provides an overspray extraction duct or channel as part of a powder overspray collection apparatus having unobstructed inlet slots on either side of the extraction duct that have sufficient cross-sectional area or open volume so that overspray material will readily and easily fall through the inlet slots and into the extraction duct without accumulating or otherwise being impeded, for example, by being impeded in such a way that would reduce air flow into the extraction duct or reduce the amount of material that falls into the extraction duct. In an exemplary embodiment of this first concept, an inlet slot to the extraction duct may be provided by a moveable panel that is pivotally mounted to a lower portion of the spray booth floor. The pivoting movement may be about an axis that is offset from a lower end of the moveable panel and a lower end of the spray booth floor. The offset axis also is arranged to provide a standoff or gap between the moveable panel and the floor so that the inlet slot has sufficient area or volume to allow the overspray material to enter the extraction duct.

The inlet slot concept presents an open pathway for material to enter the extraction duct. In another embodiment of this concept, an inlet slot provides a transition volume into the extraction duct that produces shear forces on the overspray material as it passes through the inlet slot and into the extraction duct. The concept of providing unobstructed inlet slots to the extraction duct without the overspray material being impeded from passing into the extraction duct has broader application than just to the embodiments herein, and may be used in any overspray collection apparatus that utilizes an extraction duct or channel to remove the overspray material from the spray booth.

In another alternative embodiment of the first concept, the unobstructed inlet slot to generate shear forces on the overspray material may be realized without using a moveable panel.

A second concept described in this disclosure contemplates a source of air flow within an extraction duct that is in addition to air flow through the extraction duct that is generated by the overspray collection apparatus. This supplemental or additional air flow may be used to maintain overspray material in the extraction duct air stream or to dislodge or otherwise push overspray material that may have fallen out of the extraction duct air stream to be re-entrained into the extraction duct air stream, and also for the overspray material to be pushed towards an outlet or suction end of the extraction duct. In an exemplary embodiment of this second concept, the additional air flow may be provided from a source of pressurized air which optionally may be pulsed at selected intervals and durations in relation to the anticipated quantity of overspray material entering the extraction duct. The pulses of pressurized air may be used to blast or apply energy to the overspray material to move it along the extraction duct and re-entrain overspray material into the exhaust air flow towards the extraction duct outlet.

In another exemplary embodiment of the second concept, the additional air flow within the extraction duct may be realized in the form of an air diffuser that receives pressurized air from a pressurized air source. The air diffuser may include a number of air jets or other openings that direct pressurized air into the extraction duct. The air diffuser may optionally also be used to direct pressurized air into the inlet slots of the extraction duct.

This second concept of adding pressurized air into an overspray extraction duct has broader application than just to the embodiments herein, and may be used in any overspray collection apparatus that utilizes an extraction duct or channel, to remove the overspray material from a spray booth.

A third concept described in this disclosure provides a spray booth extraction duct having moveable panels that can be moved to open and close the extraction duct. When the extraction duct is in an open position, an operator has access to interior surfaces of the extraction duct for cleaning. When the moveable panels are in the closed position, the extraction duct may be used for removing overspray material from the spray booth. In an exemplary embodiment of the third concept, the moveable panels can be used to form a suction hood portion of an extraction duct or channel, and may have a first or closed position that presents the extraction channel for removing overspray material from the spray booth. The moveable panels have a second or open position that permits an operator to access the extraction duct interior for cleaning for example, during a color change or material change operation.

In another embodiment of the third concept, one or more optional actuators may be used to move one or more of the moveable panels from a first position to a second position. The one or more actuators may be used to open and close the extraction duct moveable panels automatically without need for an operator to move the panels manually. In an optional embodiment, an actuator, which may be the same actuator or a different actuator used to open and close the extraction duct, may be used to apply an impulse force to a moveable panel to assist dislodging overspray material that may have alighted on a surface of the moveable panel so that the dislodged material will fall or move into the extraction duct or channel. The concept of using one or more actuators to open and close an extraction channel or duct may be used in any overspray collection apparatus that utilizes an extraction duct or channel to remove the overspray material from the spray booth.

The above three concepts are not the only concepts of the present disclosure, and other concepts, features and aspects of the various inventions will be presented in the following detailed description of the exemplary embodiments.

With reference to FIG. 1, a powder coating material application system 10 may include a spray booth 12 that for purposes of the present disclosure is illustrated in a generic manner. The specific design and configuration of the spray booth 12, other than the teachings herein related to an extraction duct or channel within the spray booth, form no part of the present inventions and, therefore, any spray booth design may be used as needed. The exemplary spray booth 12 may be rectangular and extend lengthwise along a longitudinal axis X, wherein work pieces travel in the direction of the arrow 28 from an entrance end 28a to an exit end 28b of the spray booth 12. We use the term "longitudinal" and derivatives thereof to refer generally to a line or direction of travel of workpieces through a spray booth from an entrance end to an exit end, whether the spray booth is square, rectangular, round or has some other geometric configuration.

The exemplary spray booth 12 may include first and second side walls 14, 16, a ceiling 18 and first and second end walls 20, 22. These side walls, end walls and ceiling form a canopy 24 that is used to contain overspray material as is well known. A typical spray booth 12 may have various openings in the side walls 14, 16 for material application devices such as automatic and manual spray guns (not shown), and light admitting windows (not shown) in the ceiling. An opening 20a is provided in the entrance end wall 20 so that workpieces or objects to be coated can pass into the spray booth 12. Doors (not shown) typically form part of the second or exit end wall 22 so that workpieces that have been coated can pass out of the spray booth 12. These doors are typically closed during coating operations. The ceiling 18 typically includes a conveyor slot 26 to allow hangers or other mechanisms used to support the workpieces and objects from an overhead conveyor (not shown) to pass along the length of the spray booth 12.

The spray booth 12 may be supported on a structural frame 30 above the shop floor F. For example, the spray booth 12 in FIG. 1 may be raised about two and a half feet or so above the shop floor F. The structural frame 30 provides space for service bays that may enclose or house control equipment, air hoses and so on.

Typically, a plurality of powder coating material application devices (not shown) are used to coat objects as they advance through the spray booth interior. These application devices may include automatic and manual spray guns, for example. Automatic guns often are mounted on a gun mover (not shown) which may include a reciprocator or oscillator as are well known in the art. The spray gun mover system may be used to both extend and retract the spray guns with respect to the spray booth 12 and also may be used to produce an up/down oscillatory motion of the spray guns during a spray operation. The application devices may be selected from any number of spray gun designs, including but not limited to spray guns available from Nordson Corporation, Westlake, Ohio.

Overspray powder that does not adhere to an object or workpiece falls into an overspray collection apparatus, for example, a duct (not shown in FIG. 1). An overspray recovery system 34 may be realized in the form of a cartridge style separator 36, however, other recovery separator designs may be used, for example, a cyclone. The recovery separator 36 functions to remove overspray powder that is entrained in a substantial exhaust air flow or air stream that is drawn through the overspray collection apparatus via an exhaust duct 38 that is in fluid communication with a suction outlet of the overspray collection apparatus at the exit end 28a of the spray booth 12. The exhaust air may be produced by one or more high volume high flow rate exhaust fans 40 that generate a substantial suction and resultant air flow into the spray booth 12, through the overspray collection apparatus and out the exhaust duct 38 to the recovery separator 36. The exhaust fan 40 suction provides a negative pressure condition inside the spray booth 12 relative to air pressure outside the spray booth 12, and the resultant air flow into the spray booth 12 serves as containment air to prevent coating material from escaping into the ambient environment, as is well known in the art.

After the overspray powder has been separated from the exhaust air, the exhaust air typically passes to an after filter system (not shown) and may then be released to atmosphere, while the separated powder may be returned to a feed center (not shown) for re-use or otherwise dumped to waste or reclaimed in some other manner. The present inventions are not directed to any aspect of the overspray recovery system 34, other than to the extent that a suction and high flow exhaust air stream are drawn from the spray booth 12 through the overspray collection apparatus via the exhaust duct 38 at a suction outlet or suction end of the overspray collection apparatus.

All of the walls for the spray booth 12 structure, including by not limited to the ceiling 18, side walls 14, 16 and doors may each be made of any suitable material as required, for example, thermoplastic materials such as polypropylene or co-polypropylene. Alternatively, stainless steel may be used.

Figure 2:
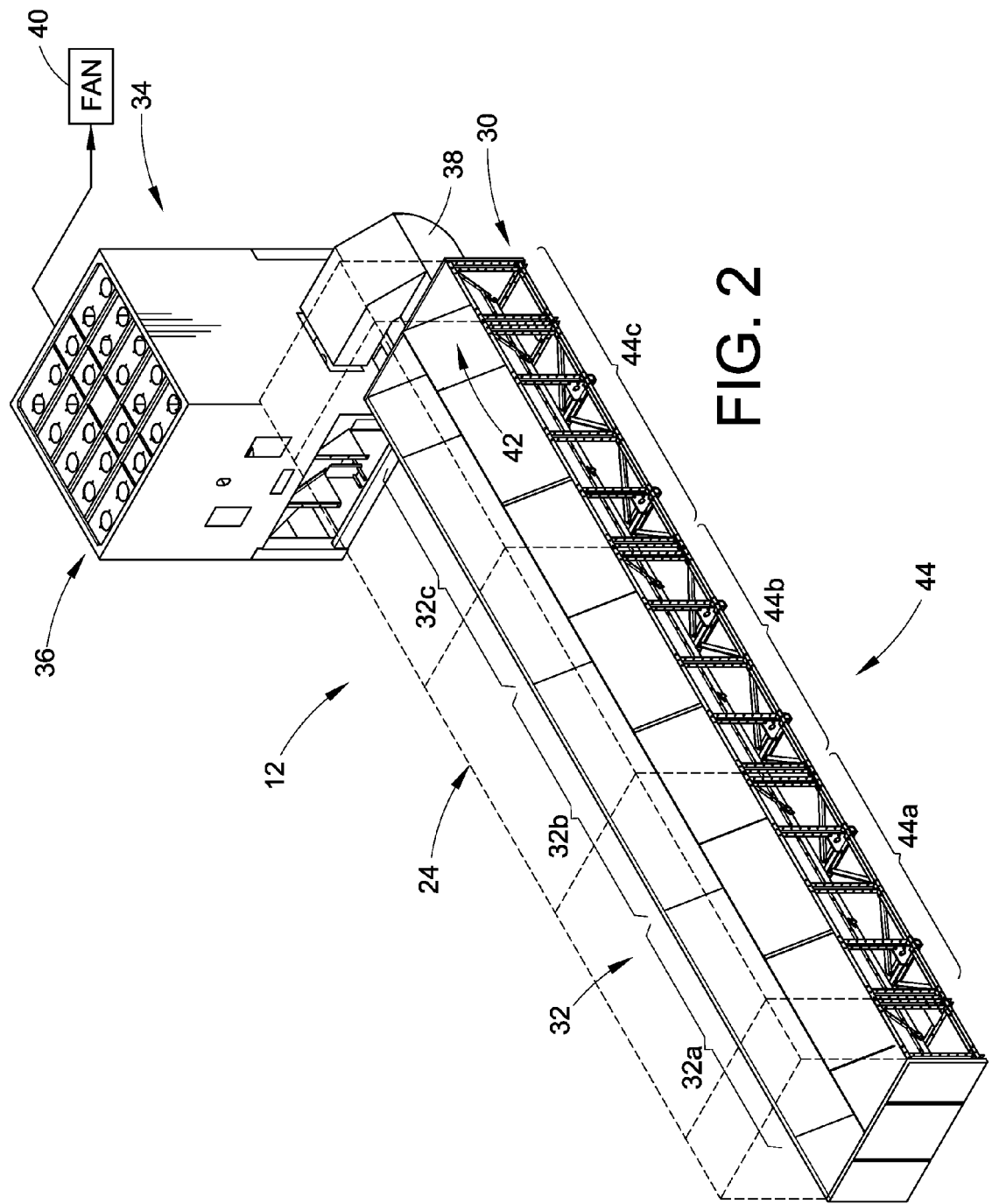

With reference to FIG. 2, the spray booth canopy 24 (shown now in phantom) extends over an overspray collection apparatus 32 which may be supported within and by the structural frame 30. Although not required, it is preferred that the overspray collection apparatus 32 be made in a modular configuration, with similar modular sections (32a, 32b and 32c) that can be positioned end to end along the length of the canopy 24. In this way, the overspray collection apparatus 32 and the spray booth 12 may be configured to have whatever suitable length is needed for a particular material application apparatus 10.

A modular structure 44 is illustrated in FIG. 2 in that the overspray collection apparatus 32 is shown with three similar although not necessarily identical modular sections 44a, 44b and 44c. These modular sections 44a, 44b, 44c are similar to the extent that they are supported in similar frames and when joined end to end form a complete overspray collection apparatus 32. The number of sections 44 used and their individual lengths may be selected as needed for a particular spray booth 12. The canopy 24 may also be modular if so desired in a manner consistent with the modular overspray collection apparatus 32 but such is not required. The overspray collection apparatus 32 includes a suction outlet or suction end 42 that is in fluid communication with the overspray recovery system 34 via the exhaust duct 38.

With reference to FIGS. 1A, 3, 5 and 5A then, one of the modular sections 44a is illustrated, along with a respective portion of the canopy 24. The canopy 24 is illustrated with some additional detail such as optional skylights S and access doors D to allow access to the spray booth interior by an operator using a manual spray gun or for automatic spray guns mounted on a gun mover (not shown), but all these features are optional as noted herein above. The structural frame 30 (FIGS. 1 and 2) may also be modular in a manner consistent with the modular overspray collection apparatus 32. Therefore, these modular units or sections are labeled 32a for one of the overspray collection apparatus sections and 30a for one of the structural frame sections in FIG. 1A but the description of the overspray collection system 32 structure and operation applies equally to each of the modular sections 32a, 32b and 32c (FIG. 2).

As noted above, the canopy 24 may include a first side wall 14 and a second side wall 16 which support the ceiling 18. These side walls 14, 16 are supported on the structural frame 30 and typically are vertically oriented relative to the floor F but other orientations and shapes may be used as needed. The vertical orientation of the side walls 14, 16 tends to prevent overspray powder from adhering to the side walls 14, 16.

Figure 3:
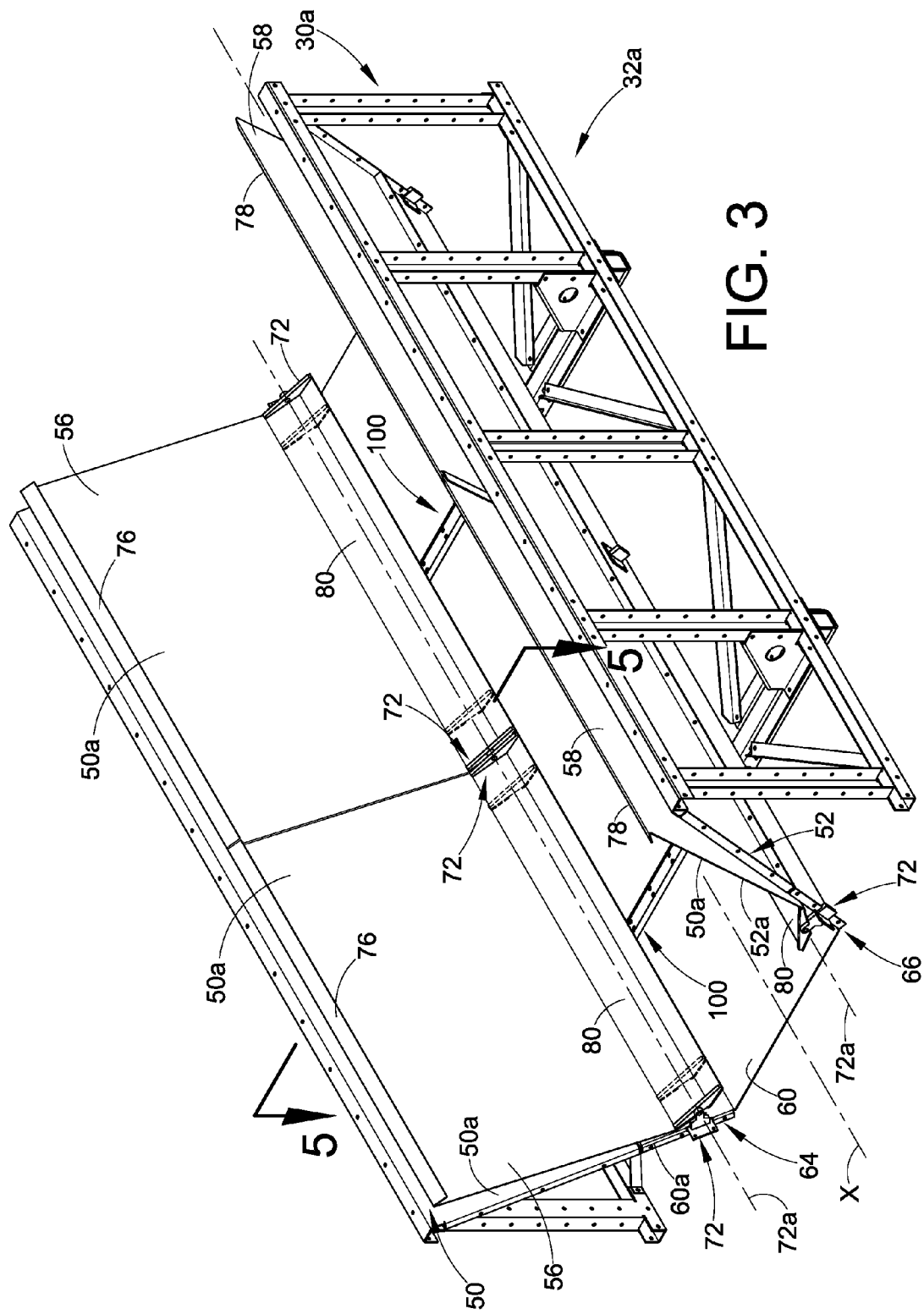

The overspray collection apparatus 32 may include a floor and an extraction duct in the middle of the floor. In an exemplary embodiment, the floor may include a first sloped floor 50 and a second sloped floor 52, disposed respectively on each side of an extraction channel or duct 54. The overspray collection apparatus 32 may extend longitudinally along the entire length of the spray booth 12 or a portion thereof along the X axis for example. The sloped floors 50, 52 may coextend with the extraction duct 54. The extraction duct 54 may also include optionally moveable first and second panels 56, 58. The extraction duct 54 also includes an extraction duct floor 60. It is preferred that the moveable panels 56, 58 can be moved between a first or closed position as illustrated in FIG. 1A and a second or open position as illustrated in FIG. 3. By a closed position is meant that the moveable panels 56, 58 are in a position so as to form a suction hood 62 that extends over at least a portion of or the entire extraction duct floor 60 to form the extraction duct 54. The open position of the moveable panels 56, 58 means that the panels 56, 58 are moved apart a sufficient distance to allow an operator access to the extraction duct 54 interior surfaces for cleaning operations. This does not necessarily require that the panels are swung fully to a position such as illustrated in FIG. 3, although for convenience such is preferred.

The extraction duct 54 includes a first lateral side 64 and a second lateral side 66. The first sloped floor 50 extends downward and away from a bottom end or edge 68 of the first side wall 14 towards the first lateral side 64 of the extraction duct 54. The second sloped floor 52 extends downward and away from a bottom end or edge 70 of the second side wall 16 towards the second lateral side 66 of the extraction duct 54.

The first and second moveable panels 56, 58 may be pivotally mounted to the sloped floors 50, 52 respectively by any suitable mechanism. In one embodiment, the first and second moveable panels 56, 58 may be pivotally mounted to the sloped floors 50, 52 with hinges 72. Each hinge 72 operates about a pivot axis 72a to allow the first moveable panel 56 and the second moveable panel 58 to be swung between the open and closed positions by rotation about the pivot axes 72a as represented by the directional arrows Y in FIG. 1A.

It will be noted from FIG. 1A that when the first and second moveable panels 56, 58 are in their closed positions to form the suction hood 62, the panels 56, 58 are sloped from an apex 74 where they meet along respective upper edges 76, 78 (FIG. 3). The first and second moveable panels 56, 58 slope downward and outward from the apex 74 towards the first lateral side 64 and the second lateral side 66 respectively of the extraction duct 54. The included angle $\alpha$ (FIG. 4) of the first and second moveable panels 56, 58 in their closed position (FIG. 1A) may be selected as needed. Two examples are forty-five degrees and sixty degrees but any suitable angle may be used. A narrower angle $\alpha$ may help gravity to assist the overspray powder to fall towards the first and second lateral sides 64, 66 of the extraction duct 54, but also may require a higher air flow through the extraction duct 54. A narrower angle $\alpha$ may also be used to make the spray booth footprint smaller (less wide for example) if so needed. The use of the sloped floors 50, 52 facilitate using a suction hood 62 having a desired included angle $\alpha$ and height of the suction hood 62.

As will be observed from FIG. 3, within a modular unit or section of the overspray collection apparatus, such as 32a for example, there may be more than one moveable panel 56, 58 on either lateral side of the extraction duct 54 (in the example of FIG. 3 there are two moveable panels on either side of the extraction duct 54). This may be done because of the weight of moveable panels or to allow for the extraction duct 54 to be opened in sections during a cleaning operation as the operator walks along the extraction duct floor 60 from the entrance end 28a of the spray booth 12 towards the exit end 28b of the spray booth 12 (see FIG. 1), with the exhaust duct 38 being disposed at the exit end 28b. Each moveable panel 56, 58 may be individually pivotally mounted to a respective sloped floor 50, 52. Alternatively, each modular section of the overspray collection apparatus 32 may use a single moveable panel 56, 58 on either side of the extraction duct 54. When the moveable panels 56, 58 are in their open position, an operator has easy access to the interior surfaces of the extraction duct 54 and can walk along the duct floor 60 towards the exhaust duct 38 (FIG. 1), blowing overspray material towards the suction end of the extraction duct and the exhaust duct 38 to clean the surfaces.

With reference to FIGS. 3, 4, 5 and 5A, the extraction duct 54 preferably is made of stainless steel or other suitable abrasion resistant material when the coating material being used is porcelain enamel glass powder or frit, or other abrasive material. The extraction duct 54 includes an extraction duct floor 60 that has upwardly tapered sides 60*a* and 60*b* of the extraction duct floor 60. These upwardly extending sides 60*a* and 60*b* may taper at the same angle as the sloped floors 50, 52 and smoothly blend together so as to form a complete sloped floor 50, 52 on either side of the extraction duct 54 that extend down to the extraction duct floor 60. Alternatively, the sloped floors 50, 52 may each be single piece constructs and extend to the lateral edges of the extraction duct floor 60, and preferably be provided with a transition structure so that a sharp corner or other entrapment area is not presented.

The first and second moveable panels 56, 58 may be provided with bent flanged ends or edges 76, 78 so that in the closed position the two moveable panels 56, 58 meet at the apex 74 with a flush surface to surface contact (the flanged ends 76, 78 being vertical when the moveable panels 56, 58 are in the closed position) for reducing loss of air from the extraction duct 54 through the apex 74.

Figure 4:
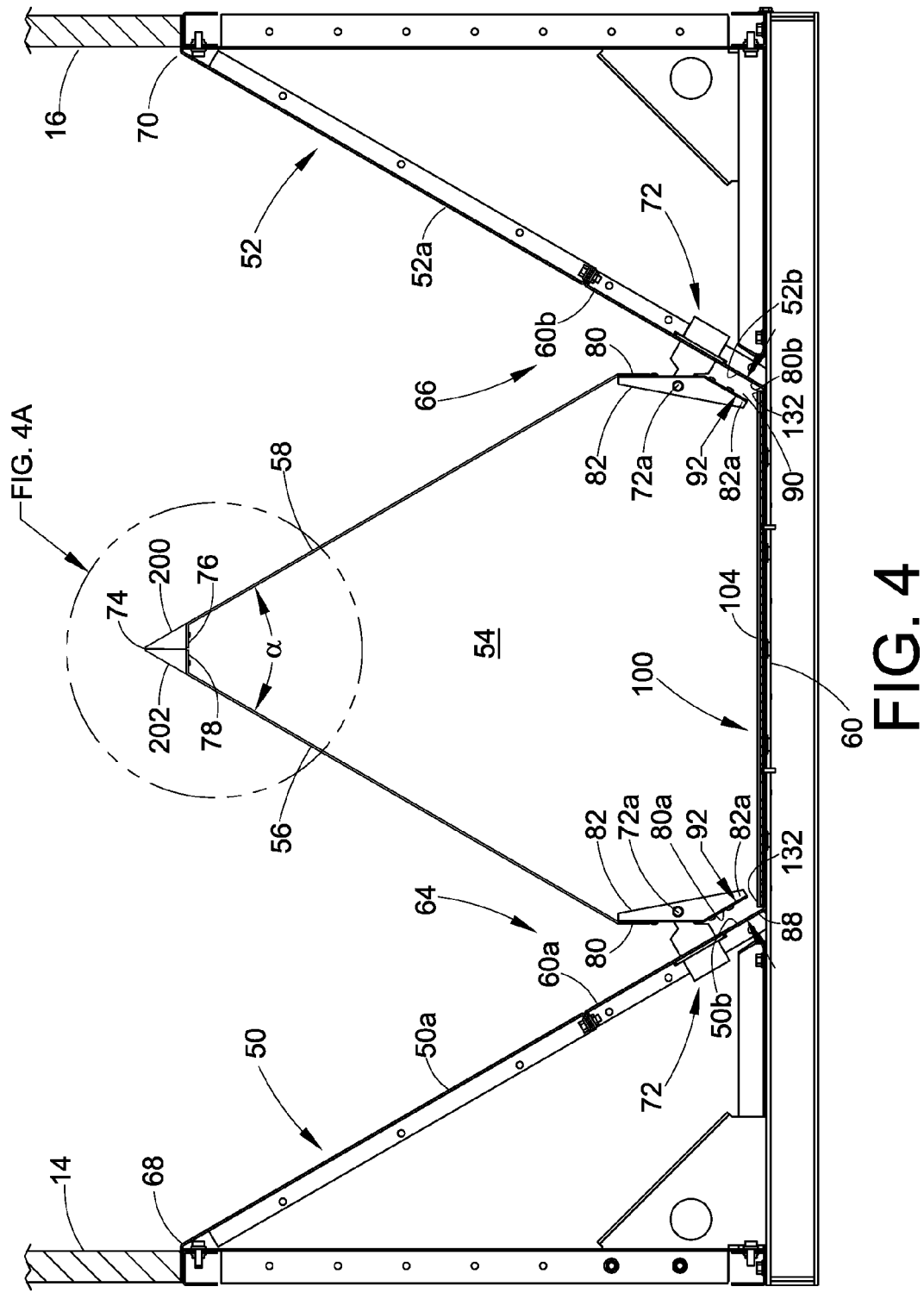
Figure 4A:
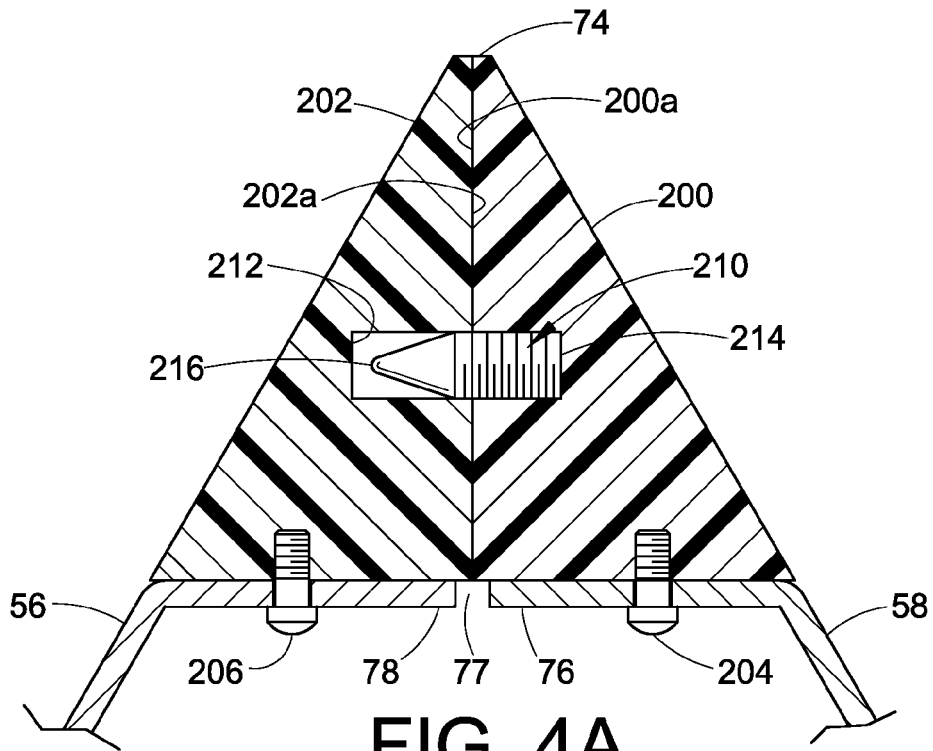
Figure 4B:
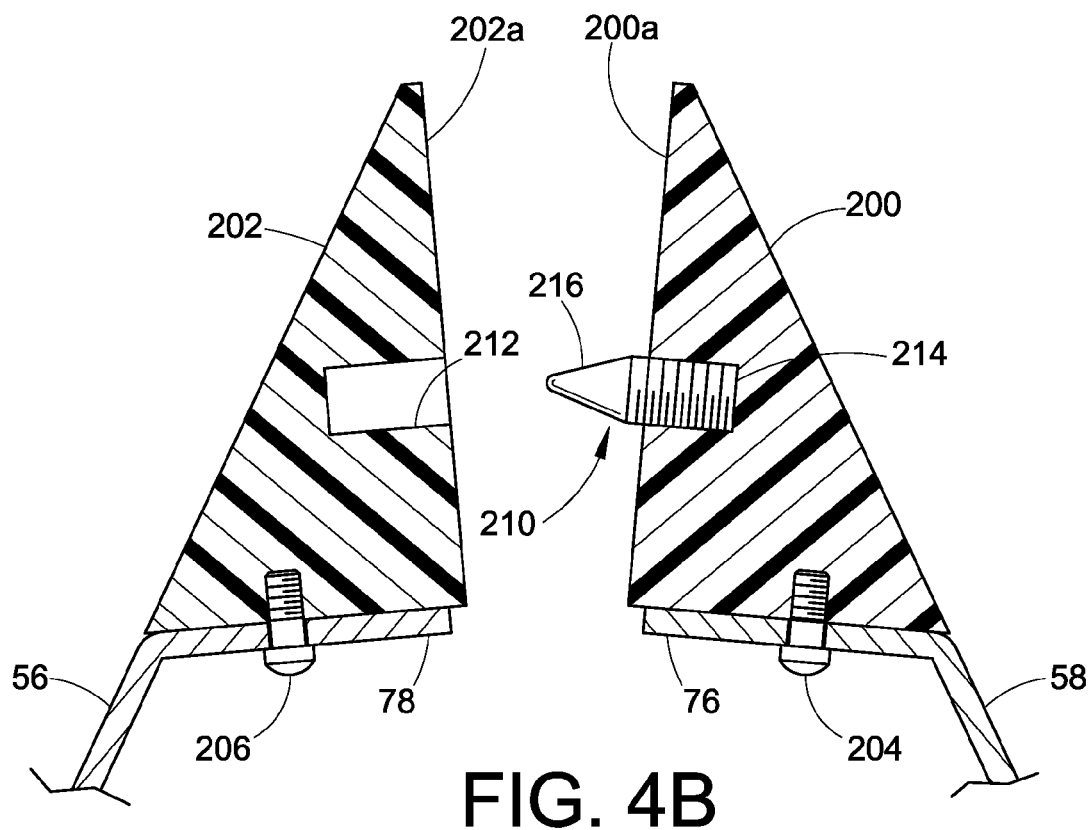

Note that FIG. 4 illustrates an alternative embodiment for the apex portion of the suction hood 62. FIGS. 4A, 4B and 4C provide greater detail of this alternative embodiment. The flanged ends 76 and 78 are bent so that when the suction hood 62 is in the closed position, these flanges 76, 78 are horizontal. In order to still present a smoothly tapered apex 74, we provide a first plastic triangular ridge piece 200 and a second plastic triangular ridge piece 202. These plastic ridge pieces 200, 202 may be attached to the respective flanges 76 and 78 by any suitable means, such as fasteners 204, 206 for example. As best illustrated in FIG. 4C the ridge pieces 200 and 202 extend lengthwise to form the apex 74 along the length of the moveable panels 56, 58. When the moveable panels 56, 58 are in the closed position, inside surfaces 200*a* and 202*a* meet to a flush contact to form a good seal against loss of suction within the extraction duct 54. We prefer although it is not required that in the closed position the inside surfaces 200*a* and 202*a* make contact before any contact is made between the ends of the horizontal flanges 76, 78. To this and, the flanges 76, 78 may be sized so as to present a gap 77 (FIG. 4A) therebetween when the ridge pieces make contact in the closed position.

FIGS. 4A and 4B further illustrate an optional feature. We provide a series of indexing pins 210 and indexing holes 212 that are sized to receive the indexing pins 210. Each indexing pin 210 may be threadably retained in a hole 214, and further the indexing pin preferably includes a profile, for example a tapered end 216, that facilitates the indexing pin moving into the respective indexing hole 212. FIG. 4A illustrates the assembly when the moveable panels 56, 58 are in their closed position, and FIG. 4B illustrates the assembly when the moveable panels 56, 58 are in a slightly open or separated position. As the moveable panels 56, 58 are closed, the indexing pins 210 will engage with the indexing holes 212 to the position of FIG. 4A. This helps to maintain alignment of the moveable panels 56, 58 into the closed position to assure good contact between the ridge pieces 200, 202. The indexing pins 210 and indexing holes 212 preferably are aligned with hinges (discussed below) that allow the moveable panels 56, 58 to pivot between their open and closed positions.

As best illustrated in FIGS. 3 and 4, each moveable panel 56, 58 includes a bent skirt 80 at a lower end thereof. These skirts 80 may be used to attach the moveable panels 56, 58 to respective hinges 72. Each hinge 72 includes a pivot arm 82 that may be used to support the moveable panels 56, 58 for pivoting movement between the exhaust duct 54 open and closed positions. Preferably, each moveable panel 56, 58 is pivotally mounted on opposite longitudinal ends by two hinges 72 (see FIG. 3 for example). The skirts 80 may be angled so that when the moveable panels 56, 58 are in the closed position (FIG. 4), the skirts 80 extend parallel to lower portions 50*b* and 52*b* of the sloped floors 50, 52. The moveable panels 56, 58 are thus pivotally mounted to lower portions of the sloped floors 50, 52.

In FIG. 3 we illustrate an alternative embodiment for the location of the hinges 72. Depending on the length of each panel 56, 58 it may be desirable in some cases to mount the hinges 72 in-board of the edges of the panels 56, 58. We illustrate this alternative location of the hinges 72 in phantom in FIG. 3. For example, each hinge 72 may be disposed in-board from its respective panel edge by about 15% of the total length of the panel. This in-board mounting can provide more stiffness for larger panels.

From FIGS. 1A and 4 it will be observed that each hinge 72, which is used as one exemplary embodiment of a mechanism for pivotally mounting the moveable panels 56, 58 to the sloped floors 50, 52, are each mounted to a respective sloped floor 50, 52 in an offset position relative to the extraction duct floor 60. In the exemplary embodiment, the hinges 72 may be mounted above the location where the sloped floors 50, 52 blend with the extraction duct floor 60. In other words, each pivot axis 72*a* is positioned above the lower edge of the respective sloped floor 50, 52 and therefore also vertically higher than the extraction duct floor 60. In addition, the pivot arm 82 includes a portion 82*a* that extends below the pivot axis 72*a* so that a lower portion 80*a* of the skirt 80 also extends below the pivot axis 72*a*.

Each offset mounted hinge 72 may also provide a standoff or gap 92 between a lower portion (80*a*, 80*b*) or end of the skirt 80 and a lower portion or end 50*b* 52*b* of the sloped floors 50, 52 to which the hinge 72 is mounted, so that when the moveable panels 56, 58 are in the closed position (FIG. 4), a first inlet slot 88 and a second inlet slot 90 on respective sides of the extraction duct 38 are presented through which overspray material can pass through from the spray booth 12 interior into the extraction duct 38.

It will be further noted from FIG. 4 that the inlet slots 88, 90 are of reduced volume in a lower portion below the pivot axis 72*a* than above the pivot axis 72*a*. This provides a funneling effect, which allows shear forces from the moving containment air through the inlet slots 88, 90 to push the overspray material through the inlet slots 88, 90 and into the extraction duct to entrain the material into the air stream through the extraction duct 54 and to reduce opportunity for the overspray material to accumulate or bind up in the inlet slots 88, 90. The inlet slots 88, 90 are substantially open along their axial lengths with only small surfaces on the hinges 72 being exposed to the overspray material. These surfaces will not significantly interfere with the flow of overspray material into the extraction duct and can be contoured such as by rounding to virtually eliminate any overspray material from alighting on the hinge 72 surfaces.

The size of the standoff or gap 92 that serves as the inlet slots 88, 90 can be determined based on how much overspray material can be expected to be dropping through the inlet slots and the volume of containment available to entrain that material. The size of the standoff or gap 92 can be selected so that the inlet slots will not impede the flow of overspray material into the extraction duct 54. In the exemplary embodiments, the inlet slots 88, 90 are formed by the generally parallel planes of the lower skirts 80a, 80b and the lower portions 50b, 52b of the sloped floors when the extraction duct 54 is in the closed position. The gap 92 in some applications may be provided with an increasing or decreasing size along the longitudinal axis X if so needed. As an alternative approach, the inlet slots 88, 90 may be provided in an overspray collection apparatus that does not utilize moveable panels 54, 56 for the suction hood 62. Moreover, in a more general application, the pivot axis 72a and the hinge 72 locations may be selected that are other than offset from the lower ends or lower portions of the moveable panels 54, 56 and the sloped floors. The inlet slots 88, 90 in other words may be formed by two surfaces 80a, 50b that have a standoff or gap 92 provided between them by any convenient support structure, whether hinged as in the exemplary embodiment or by another support structure, positioned at selectable locations other than offset as in the exemplary embodiments.

Figure 6:
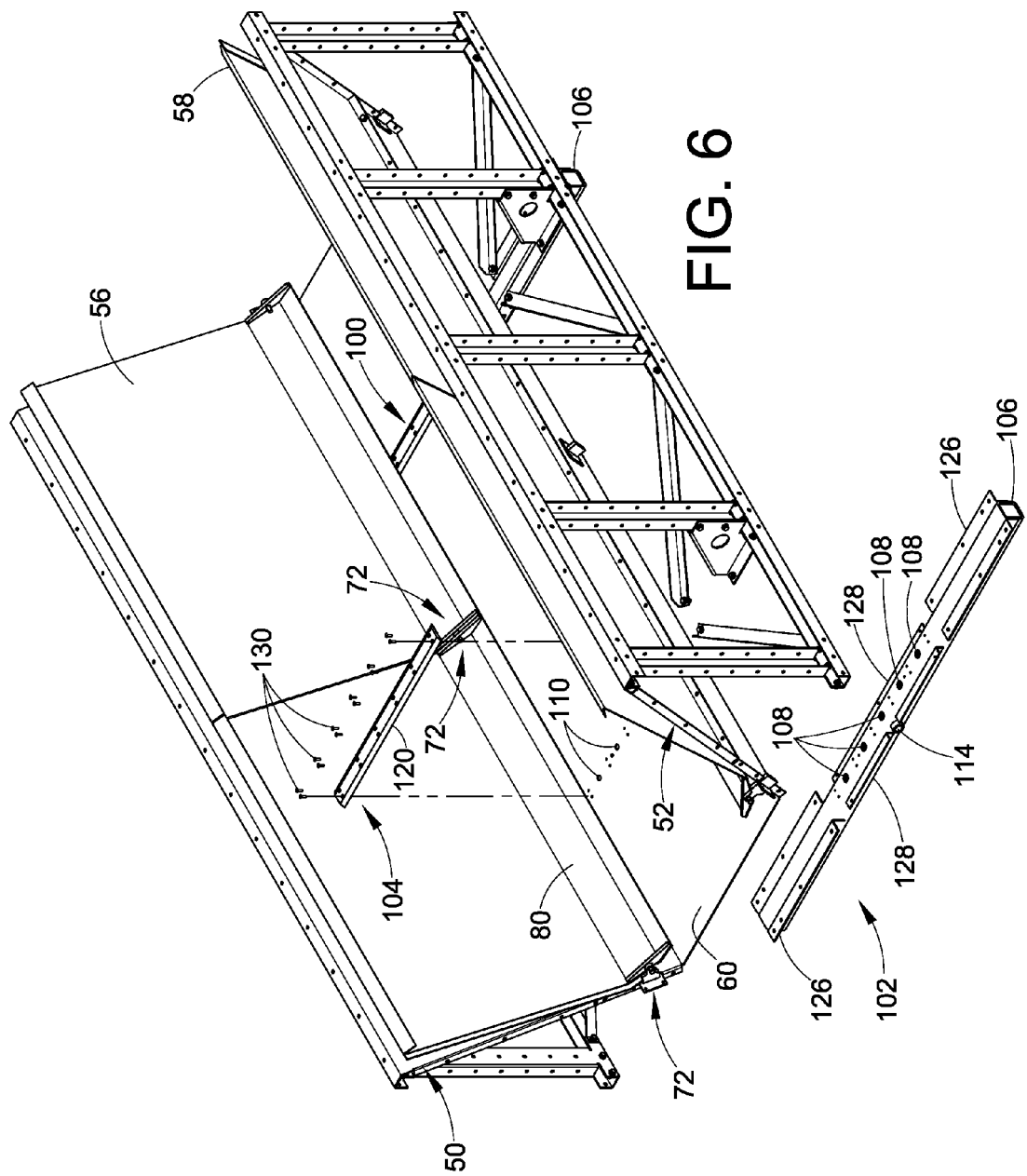
Figure 6A:
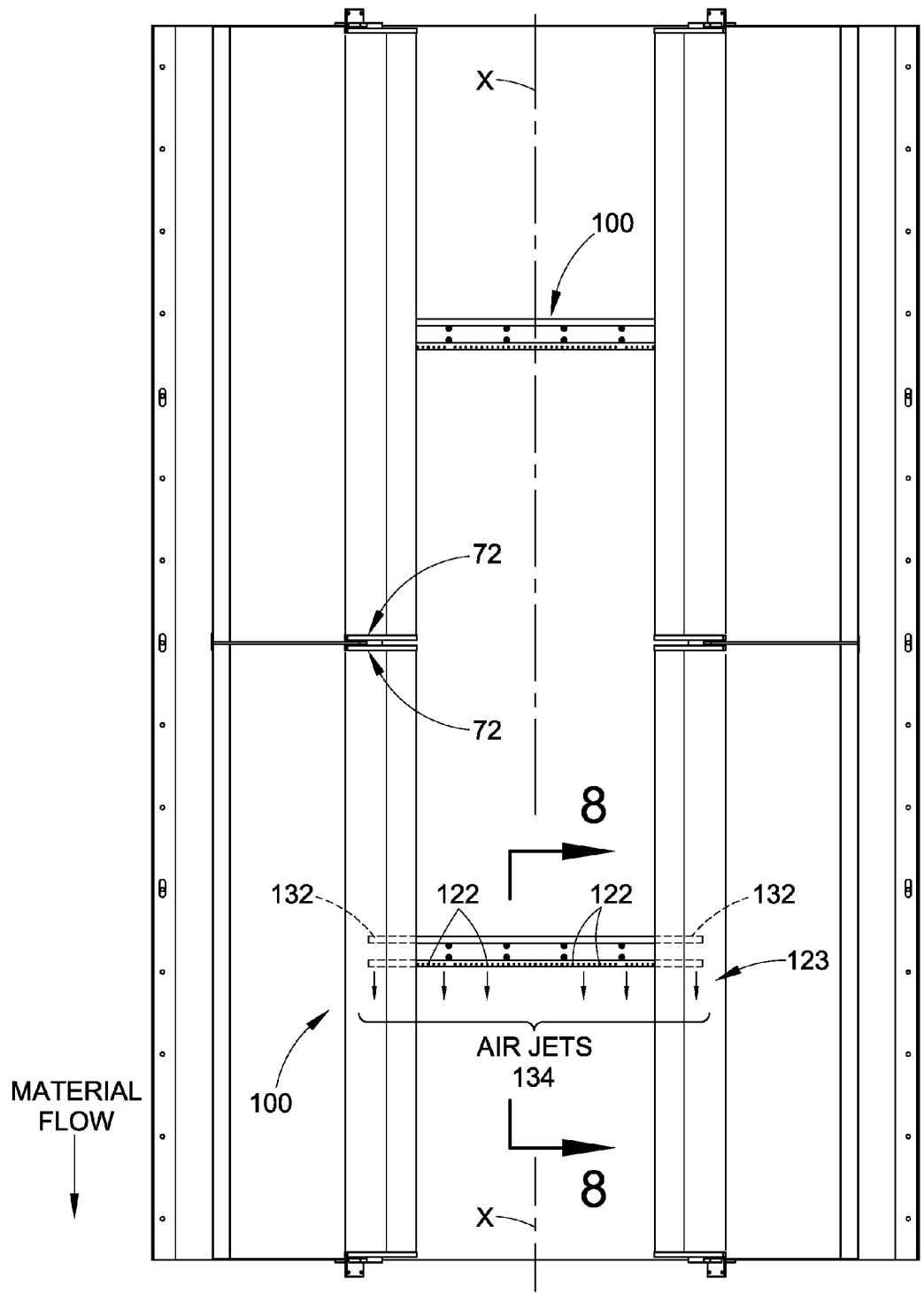

With reference to FIGS. 3 and 6A, in accordance with another aspect of the disclosure, an overspray collection apparatus 32 may optionally include an air diffuser or air manifold within an extraction duct or channel 54. This concept may be used with the inlet slot concept described above, or may alternatively be used in other extraction or recovery ducts for many different spray booths and overspray recovery systems. Although we refer to the exemplary structure as an air diffuser embodiment, the concept contemplates more generally a source of pressurized air that is provided within the extraction duct so that pressurized air blows overspray material towards the outlet end of the extraction duct. This added pressurized air flow thus augments the air flow that is produced in the extraction duct by the containment air that flows into the extraction duct. The added air flow may be directed into the exhaust duct so as to maintain overspray material in the extraction duct air stream or to dislodge or otherwise push overspray material that may have fallen out of the extraction duct air stream to be re-entrained into the extraction duct air stream, and also for the overspray material to be pushed towards an outlet or suction end of the extraction duct.

In an exemplary embodiment, an air diffuser may be disposed in an orientation that is generally lateral to the longitudinal axis of the extraction duct so that jets of air are directed toward the suction end 42 of the extraction duct 54. The additional pressurized air may be used to re-entrain overspray material that has fallen out of the air flow that is moving through the extraction duct to prevent overspray material from residing in the extraction duct. Accordingly, it is preferred but not required that the pressurized air be applied in a pulse fashion periodically or as needed to maintain as much overspray powder that has entered the extraction duct through the inlet slots to remain entrained in the air stream or be re-entrained. In accordance with another optional aspect of this concept, the pressurized air preferably may also be applied within the inlet slots of the extraction duct to assist moving the overspray material into the extraction duct and entrained in the air flow through the extraction duct.

As shown in FIG. 3, an air diffuser assembly 100 may be disposed on the extraction duct floor 60 in a direction that is generally transverse the longitudinal axis X of the extraction duct 54. The term "generally transverse" means that although it is preferred that the air diffuser assembly be oriented perpendicular to the longitudinal axis X, such may not be strictly required in all cases. The more generalized preference is that the air diffuser assembly 100, regardless of its shape, be oriented as needed to direct pressurized air into the extraction duct 54 so as to maintain the overspray powder within the sir stream flowing through the extraction duct 54, and also to apply force or to push the overspray powder in a direction towards the suction end of the extraction duct 54 and the exhaust duct 38 (FIG. 1). For the exemplary embodiments herein, the desired orientation of the air diffuser assembly 100 may thus be transverse the longitudinal axis X; but in other extraction duct designs and other shapes and sizes of the air diffuser assembly 100 the orientation may be other than transverse or perpendicular. Still further alternative embodiments contemplate that the air diffuser assembly 100 need not be formed with a straight and generally flat diffuser (104 below). The air diffuser assembly 100 may have many different sizes, shapes and configurations, to achieve the desired effect of directing pressurized air into the extraction duct 54 so as to push material towards the suction end 42 of the extraction duct 54.

FIG. 3 also illustrates that more than one air diffuser assembly 100 may be used in an extraction duct. Because the overspray material may fall out of the air stream along the length of the extraction duct, additional air diffuser assemblies may be used as needed to maintain the overspray material in the air stream all the way to the exhaust duct 38. For example, for porcelain enamel glass powder which is heavy, a plurality of air diffuser assemblies 100 may be used, spaced about three feet apart from each other along the length of the extraction duct 54. But, the number and spacing of the air diffuser assemblies 100 will vary depending on the design of the extraction duct, the type of overspray material being collected, the amount of air and flow rate of the air moving through the extraction duct, and so on, for any particular application or system.

With reference to FIGS. 6, 7 and 8, an exemplary air diffuser assembly 100 that may be used to direct pressurized fluid into the extraction duct 54 may include an air manifold 102 that is attached to the extraction duct floor 60 on the underside of the floor, and a diffuser 104 that is attached to the extraction duct floor 60 on the upper surface of the floor, meaning that the diffuser 104 is within the interior volume or space of the extraction duct 54.

The air manifold 102 may include a manifold body 106 that can be a hollow box like member. Many other shapes and configurations for an air manifold may be used for delivering pressurized air to the diffuser 104. The manifold body 106 includes one or more air passages 108 that extend upward and align with holes 110 formed in the extraction duct floor 60. An o-ring 111 may be provided to ensure a sealed interface between the air manifold a 102 and the extraction duct floor holes 110. The manifold body 106 also may include at least one air inlet port 112. An air hose fitting 114 or other suitable connection that can be used to receive pressurized air from an air source 116 is in fluid communication with the air inlet port 112 of the manifold body. An optional and preferred feature is to include a valve 118 or other control device as needed so allow the pressurized air to be optionally pulsed or supplied for controlled duration into the manifold body 106. The pressurized air may be applied as a short high energy pulse to apply an impulse force of air into the extraction duct 54 so as to blast overspray material that has fallen out of the air stream to be re-entrained. Alternatively, the pressurized air may be applied for longer durations to maintain entrainment, or need not be a high energy pulse. The frequency and energy of the applied air pressure will be selected based on a number of factors including but not limited necessarily to the type of material being collected, the size of the extraction duct, the air flow parameters through the extraction duct, and so on.

The diffuser 104 in this example may be realized in the form of a generally flat plate-like diffuser body 120. The diffuser body 120 is used to contain the pressurized air from the air manifold 102 and direct that air out through one or more diffuser holes or openings 122. The diffuser holes 122 may be small so that they produce air jets of high velocity air in relation to the pressure of the air supplied to the diffuser 104. Preferably, the diffuser holes 122 are sufficient in number and distribution so as to provide an air stream 123 that extends across the extraction duct floor 60. For example, the diffuser holes 122 may be distributed across the entire width of the extraction duct floor 60, although such may not be required in all embodiments. In one embodiment, we provide the diffuser holes 122 in such number and distribution so that an air stream (123 in FIG. 6A) is added into the extraction duct 54 to maintain overspray material in the extraction duct air stream, or to re-entrain material into the air stream that flows through the extraction duct 54. length of the diffuser body 120 (see FIG. 6A).

In an embodiment illustrated herein, the diffuser body 120 may be trapezoidal in shape with the diffuser holes 122 positioned on one side 124, which will be the side that faces towards the exhaust duct 38 (FIG. 1). Alternatively, the air diffuser 104 may be supplied with pressurized air in other fashions, for example, the air diffuser may have its own air inlet port with an end connection without the need for the under floor air manifold 102. The diffuser holes 122 are in fluid communication with a central flow passage or channel 125 that extends lengthwise through the diffuser body 120. The central flow passage 125 is in fluid communication with the holes 110 in the extraction duct floor 60 (see FIG. 8).

The air manifold 102 may be mounted to the structural frame 30 using end flanges 126 and bolts (not shown) or other suitable structures. In order to assure a good air tight connection between the air manifold 102 and the air diffuser 104, the air manifold 102 may also include flanges 128 on either side of the manifold body 106 that can be used to securely mount the air manifold 102 to the underside of the extraction duct floor 60. Similarly, the air diffuser 104 may be securely attached to the upper side of the extraction duct floor 60 using bolts or screws 130 (FIG. 6). A suitable sealant, for example polyurethane adhesive, may be used between the air diffuser 104 and the extraction duct floor 60 to provide a fluid tight interface between the central flow passage 125 and extraction duct holes 110. In this manner, pressurized air that is supplied into the manifold body 106 passes up into the air diffuser 104 and out the diffuser holes 122, as represented with the arrow F in FIG. 8.

With reference to FIGS. 4, 5 and 6A, the air diffusers 104 preferably are of sufficient length across the width of the extraction duct floor 60 so that when the first and second moveable panels 54, 56 are in the closed position to form the extraction duct 54, each air diffuser 104 includes end portions 132 that extend into the region of the inlet slots 88, 90 so as to present one or more diffuser holes 122 that provide the diffuser pressurized air (represented by the arrows 134) to the overspray material passing into and through the inlet slots 88, 90. Alternatively, the air diffuser 104 might be adapted to direct pressurized air into the region of the inlet slots 88, 90 (for example, with angled diffuser holes 122) even if the diffuser body 120 extends over a portion of the extraction duct floor 60 so as not to include end portions that extend into the region of the inlet slots 88, 90. Therefore, in alternative embodiments the diffuser body 120 may extend partially over the extraction duct floor 60.

By way of a non-limiting example (FIG. 8), a one inch air hose 136 or other suitable size may attach at one end to the air hose fitting 114 on the air manifold body 106. The other end of the air hose 136 may be connected to a pressure control outlet 138 of a valve 118, for example, a diaphragm pilot valve. The valve 118 may receive pressurized air from an accumulator 140. Although the accumulator 140 is shown schematically in FIG. 8, in practice the accumulators 140 that are used to supply the air diffuser assemblies 100 may be positioned and supported with the frame 30 (FIG. 1A). This close location to the air diffuser assemblies 100 can be used to reduce resistance and pressure drops from the accumulator 140 to the air diffusers 104.

When the valve 118 is actuated, pressurized air is fed to the air diffuser assembly 100 and exits through the diffuser holes 122. It may be desirable in some applications to pulse the air diffusers 100 rather than having a continuous supply of pressurized air. The valve 118 may be selected to operate in a pulse mode in which the valve 118 opens for short durations, for example, about 150-250 milliseconds. The force of the jetted air from the diffuser holes 122 will be a function of the duration that the valve 118 is open and the stored air pressure or energy in the accumulator 140. A system may be designed to allow for adjustment of the stored pressure, the duration of the valve 118 actuation, or both. Moreover, it is contemplated that in many applications it is desirable to regularly pulse the air diffuser assemblies 100, for example, a frequency of about every thirty seconds or so. Preferably, although not required, there may be a separate valve 118 for each air diffuser assembly 100, or alternatively for selected groups of air diffuser assemblies. This allows the designer to actuate the air diffuser assemblies 100 at different frequencies. For example, air diffuser assemblies 100 that are positioned in areas of a high number of spray guns or other sources of elevated overspray material conditions, as compared to other areas within a spray booth 12, might be pulsed more frequently so as to help maintain the overspray material entrained in the air flow through the extraction duct.

With reference to FIG. 1A, in accordance with another optional concept of the present disclosure, one or more actuators may be provided for moving the first and second moveable panels 56, 58 between the open and closed positions (as illustrated in FIGS. 4 and 5 for example). Many different techniques and apparatus may be used to effect such movement, and in one embodiment an actuator 150 having an actuator rod 152 is used, for example a pneumatically operated actuator. For convenience, adjacent first and second moveable panels may be but need not be opened and closed together. For example, a connector 154 on the distal (that is to say outer) end 156 of an actuator rod 152 may be used to connect the actuator rod 152 to a mount 158 that is part of or attached to two adjacent hinges 72. In this case, when the actuator rod 152 is extended, the actuator rod 152 pushes on the adjacent hinges 72 and the associated moveable panels will move towards the closed position. Likewise, when the actuator rod 152 is retracted, the adjacent moveable panels move towards the open position. The stroke of the actuator arm 152 can easily be determined empirically as to the stroke needed to open and close the moveable panels. Although one actuator 150 may be used for a pair of adjacent moveable panels, such is not required and a separate actuator may be used for each moveable panel 56, 58 or one actuator may be used to move more than two moveable panels.

For an embodiment of a pneumatic actuator 150, pressurized air may be stored in an accumulator 160 and a control valve 162 or other suitable control mechanism may be used to control when the actuator 150 is operated and in what direction. In an alternative embodiment, in addition to using the actuators 150 to automatically open and close the moveable panels 56, 58 and thus the suction hood 62, the control valve 162 may be used to apply short duration force impulses to the actuator 150 to "bump" or apply a force impulse to the moveable panels 56, 58 without actually moving them between the open and closed positions. This bumping action, which may be accompanied by a momentary movement, may be done periodically as needed to help dislodge any overspray material that may have alighted on the moveable panel 56, 58 outer surfaces. The frequency of this impulse actuation may be determined in part by the locations in the spray booth 12 where the overspray material is in high volume, for example at locations where many spray guns are being used. Therefore, it may be desirable in some cases that the moveable panels 56, 58 be individually actuated, or in pairs as described, and there may be a separate control valve 162 for each actuator. Also alternatively, more than one actuator 150 may be operated from a control valve 162 as needed.

During a color change or other cleaning operation, an exemplary method may include the following, with reference to FIG. 1A. Suction in the extraction duct 54 may be maintained by having the exhaust fan 40 operating. After a coating operation is completed, the suction hood 62 will be in the closed position as in FIG. 1A. Starting at the entrance end 28a, an operator may manually open the first pair of moveable panels 56, 58 (FIG. 5). The operator may use an air wand or other pressurized air source or cleaning apparatus to blow residual material off of the extraction duct surfaces and towards the outlet suction end 42 of the suction hood 62, where the material will be drawn out through the exhaust duct 38 and into the recovery system 34. Because the extraction duct floor 60 is flat, the operator can walk towards the suction end 42 as he is cleaning the surfaces of the extraction duct. The operator then can manually open the next set of moveable panels 56, 58 and clean that section of the extraction duct, and so forth all the way to the suction end 42. As each section is opened, the extraction duct becomes a walkway for the operator, and the cross-sectional area of the extraction duct 54 that is presented to the operator has the full suction present from the recovery system 34. After the extraction duct 54 has been cleaned along with the rest of the spray booth, the moveable panels 56, 58 can be moved to the closed position for the next coating operation. As an optional alternative, the actuators 150 may be used to automatically close the suction hood 62 and to sequentially open the moveable panels 56, 58 if this functionality is desired in a particular application.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof.

We claim:

1. An overspray collection apparatus for a spray booth, the overspray collection apparatus comprising:
a first side wall and a second side wall that extend lengthwise along a longitudinal axis, an extraction duct disposed between said first side wall and said second side wall and that extends lengthwise along said longitudinal axis, a first sloped floor and a second sloped floor, said first sloped floor extending downward and away from said first side wall and towards a first side of said extraction duct, said second sloped floor sloping downward and away from said second side wall and towards a second side of said extraction duct, said extraction duct comprising a duct floor that extends lengthwise along said longitudinal axis between said first side and said second side of said extraction duct and a suction hood that extends lengthwise at least partially over said duct floor, said suction hood comprising a first moveable panel and a second moveable panel, said first moveable panel being hinge mounted on said first sloped floor by a first hinge and said second moveable panel being hinge mounted on said second sloped floor by a second hinge, said first moveable panel and said second moveable panel being moveable between an open position and a closed position, said first moveable panel and said second moveable panel when in said closed position forming said suction hood, and said first moveable panel when in said closed position having a lower portion that extends below said first hinge and that is spaced from a lower portion of said first sloped floor and from said duct floor to form a first inlet slot of said extraction duct along said first side, and said second moveable panel when in said closed position having a lower portion that extends below said second hinge and that is spaced from a lower portion of said second sloped floor and is spaced from said duct floor to form a second inlet slot of said extraction duct along said second side.

2. The overspray collection apparatus of claim 1 wherein said first inlet slot and said second inlet slot produce a shear force as overspray material enters said extraction duct.

3. The overspray collection apparatus of claim wherein said first moveable panel and said second moveable panel when in said open position provide access to said extraction duct for cleaning.

4. The overspray collection apparatus of claim 1 wherein said extraction duct comprises a material that resists abrasion from coating material moving through said extraction duct.

5. The overspray collection apparatus of claim 4 wherein said material comprises stainless steel.

6. The overspray collection apparatus of claim 1, further comprising an actuator operable to move said first moveable panel between said open position and said closed position.

7. The overspray collection apparatus of claim 6, wherein said actuator comprises a pneumatically driven member that is connected at one end to said first moveable panel.

8. The overspray collection apparatus of claim 1, further comprising an actuator operable to apply an impulse force to said first moveable panel.

9. The overspray collection apparatus of claim 8, wherein said actuator comprises a pneumatically driven member that is connected at one end to said first moveable panel.

10. The overspray collection apparatus of claim 1, further comprising a first actuator operable to move said first moveable panel between said open position and said closed position, and a second actuator operable to apply an impulse force to said first moveable panel.

11. The overspray collection apparatus of claim 1 wherein coating material moving through said extraction duct comprises glass frit.

12. The overspray collection apparatus of claim 1 comprising an air diffuser that extends across said duct floor in a transverse direction to said longitudinal axis, said air diffuser being adapted to receive pressurized air, said air diffuser comprising one or more openings through which pressurized air enters said extraction duct.

13. The overspray collection apparatus of claim 12 wherein said air diffuser is disposed on an upper surface of said duct floor and extends across said duct floor past said first moveable panel lower portion and said second moveable panel lower portion to provide pressurized air into said first inlet slot and said second inlet slot.

14. The overspray collection apparatus of claim 12 wherein said air diffuser extends across said duct floor at a right angle to said longitudinal axis.

15. The overspray collection apparatus of claim 12, further comprising an air manifold that is disposed below said duct floor and is in fluid communication with said air diffuser, said air manifold being connectable to a source of pressurized air.

16. The overspray collection apparatus of claim 1, further comprising a plurality of air diffusers that are spaced along said duct floor, each said air diffuser extending across said duct floor in a transverse direction to said longitudinal axis, each said air diffuser being adapted to receive pressurized air, each said air diffuser comprising one or more openings through which pressurized air enters said extraction duct.

17. The overspray collection apparatus of claim 16 wherein said air diffusers are evenly spaced apart from each other along said longitudinal axis.

18. The overspray collection apparatus of claim 16, wherein pressurized air is supplied to said plurality of air diffusers at periodic time intervals.

19. The overspray collection apparatus of claim 1, wherein said first moveable panel and said second moveable panel are sloped and contact each other at an apex above said duct floor when in said closed position.

20. The overspray collection apparatus of claim 1, wherein:
  said first inlet slot extends along the length of said first moveable panel and said second inlet slot extends along the length of said second moveable panel.

21. The overspray collection apparatus of claim 1, wherein each of said first inlet slot and said second inlet slot extend an entire length, with respect to said longitudinal axis, of said extraction duct.

* * * * *